June 29, 1965   J. PAVELKA, JR   3,191,518

FOOD FRESHENING APPARATUS

Filed June 11, 1962   7 Sheets-Sheet 1

INVENTOR.
JOSEPH PAVELKA JR.
BY Rodney Bedell
F. Travers Burgess
ATTORNEYS

INVENTOR.
JOSEPH PAVELKA JR.
BY Rodney Bedell
F. Travers Burgess
ATTORNEYS

June 29, 1965  J. PAVELKA, JR  3,191,518
FOOD FRESHENING APPARATUS
Filed June 11, 1962  7 Sheets-Sheet 3

INVENTOR.
JOSEPH PAVELKA JR.
BY Rodney Bedell
F. Travers Burgess
ATTORNEYS

INVENTOR.
JOSEPH PAVELKA JR.
BY Rodney Bedell
F. Travers Burgess

June 29, 1965 J. PAVELKA, JR 3,191,518
FOOD FRESHENING APPARATUS
Filed June 11, 1962 7 Sheets-Sheet 5

INVENTOR.
JOSEPH PAVELKA JR.
BY Rodney Bedell
F. Travers Burgess
ATTORNEYS

June 29, 1965  J. PAVELKA, JR  3,191,518
FOOD FRESHENING APPARATUS
Filed June 11, 1962  7 Sheets-Sheet 6

INVENTOR.
JOSEPH PAVELKA JR.
BY Rodney Bedell
F. Travers Burgess
ATTORNEYS

June 29, 1965 J. PAVELKA, JR 3,191,518
FOOD FRESHENING APPARATUS
Filed June 11, 1962 7 Sheets-Sheet 7

INVENTOR.
JOSEPH PAVELKA JR.
BY Rodney Dedell
F. Travers Burgess
ATTORNEYS

United States Patent Office 3,191,518
Patented June 29, 1965

3,191,518
FOOD FRESHENING APPARATUS
Joseph Pavelka, Jr., % The Toastswell Co. Inc., 620 Tower Grove Ave., St. Louis 10, Mo.
Filed June 11, 1962, Ser. No. 202,938
12 Claims. (Cl. 99—234)

The invention relates to apparatus for instantaneously refreshening food by the use of flash-generated, superheated dry steam, and particularly to a self-contained, electrically-powered unit suitable for restaurant use. This application is a continuation-in-part of my application, Serial No. 66,065, filed October 31, 1960.

It is an object of the invention to provide, in food freshening apparatus, a simple, but highly effective, steam generating and distributing device.

It is a further object to provide food freshening apparatus of the live steam type in which the generation of steam is prevented when the lid is opened.

It is another object to provide food freshening apparatus of the type in which the steam is generated within the cover, with an adjustably counterbalanced cover.

It is a further object to provide food freshening apparatus of the live steam type in which the generation of steam is under manual control while the lid is closed and is prevented when the lid is open.

It is an additional object to provide food freshening apparatus of the live steam type in which the food tray, though normally heated, is unattached to any other structure of the device and is accordingly easily removable.

It is a further object to provide means for preventing excessively fast injection of a large amount of water into the steam generator.

It is an additional object to provide an improved pipe connection including a pivoted coupling between a reservoir in the base of the food freshener housing and the steam generator in the hinged cover.

It is another object to provide an improved flash chamber for a steam generator wherein vaporization is aided by breaking the mass of water entering the chamber into small droplets and distributing them throughout the area of the flash chamber.

Other objects and features will be in part apparent and in part pointed out hereinafter.

Figure 4:
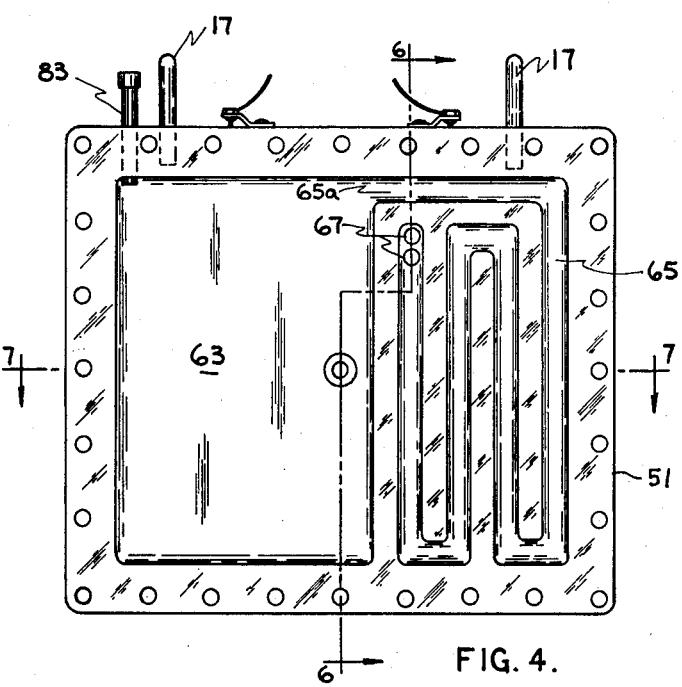
FIG. 4 is a top view of the cover casting with top cover plate removed.
Figure 5:
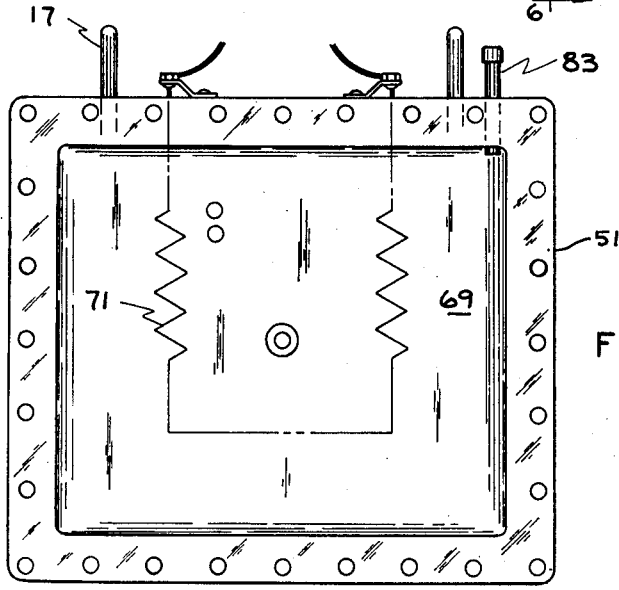
FIG. 5 is a bottom view of the cover casting with bottom cover plate removed.
Figure 6:
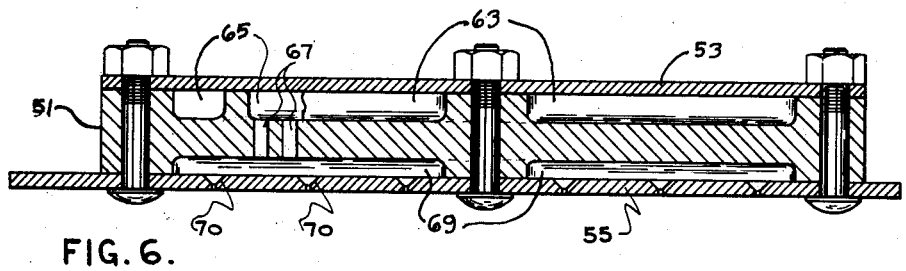
Figure 7:
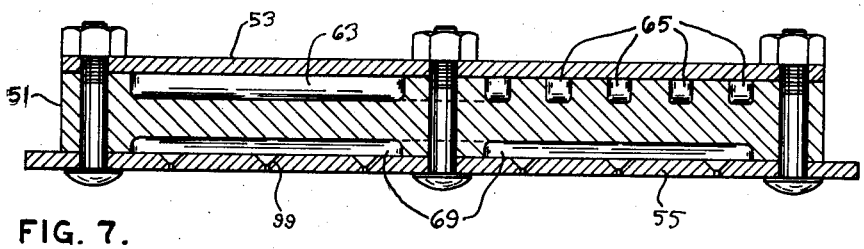

FIGS. 6 and 7 are vertical sectional views of the cover internal structure along lines 6—6 and 7—7, respectively, of FIG. 4.

Figures 8, 9:
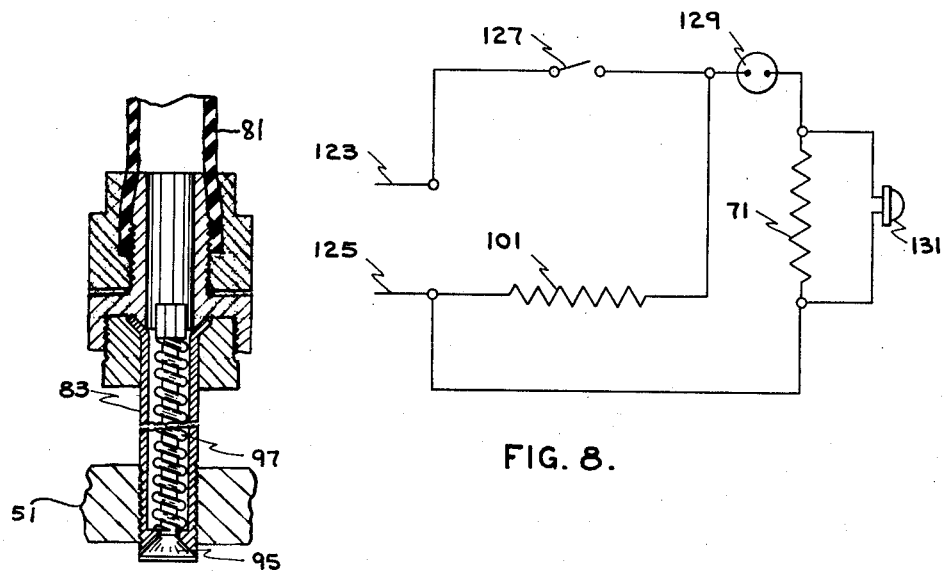

FIG. 8 is a circuit diagram of the food freshener.

FIG. 9 is a longitudinal sectional view of the water inlet valve of the steam generator.

Figure 10:
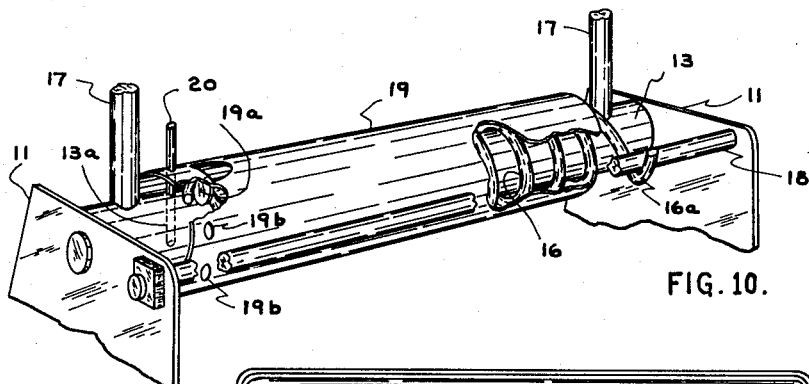

FIG. 10 is a perspective view, partially broken away, of the cover counterbalance.

Figure 11:
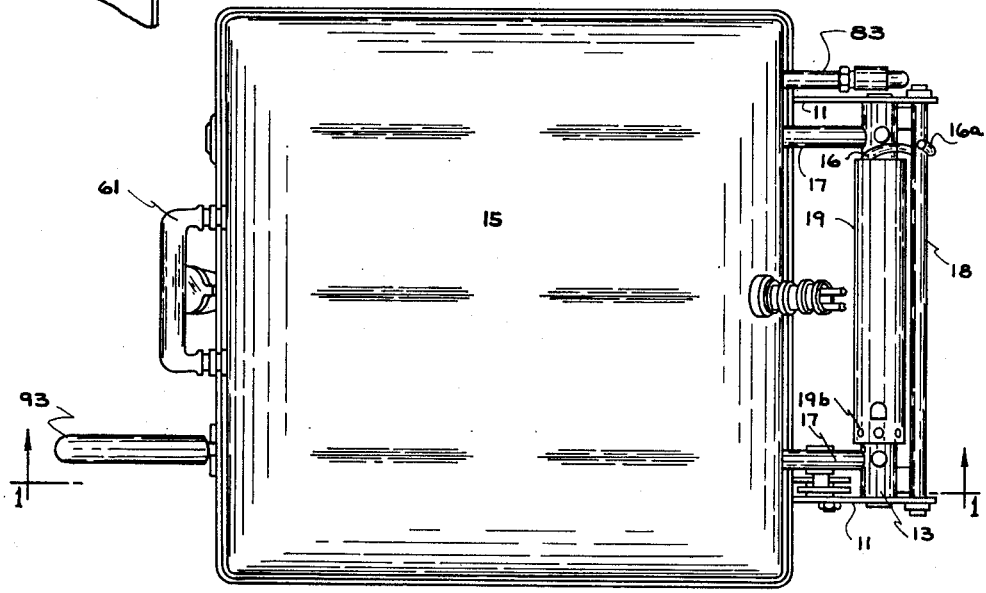

FIG. 11 is a top view of the food freshener.

Figure 12:
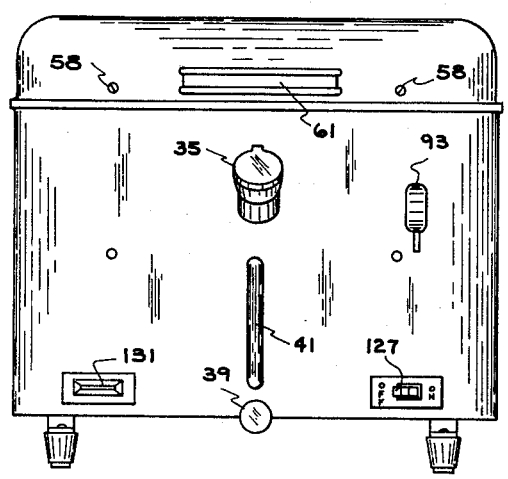

FIG. 12 is a front view of the food freshener.

Figure 13:
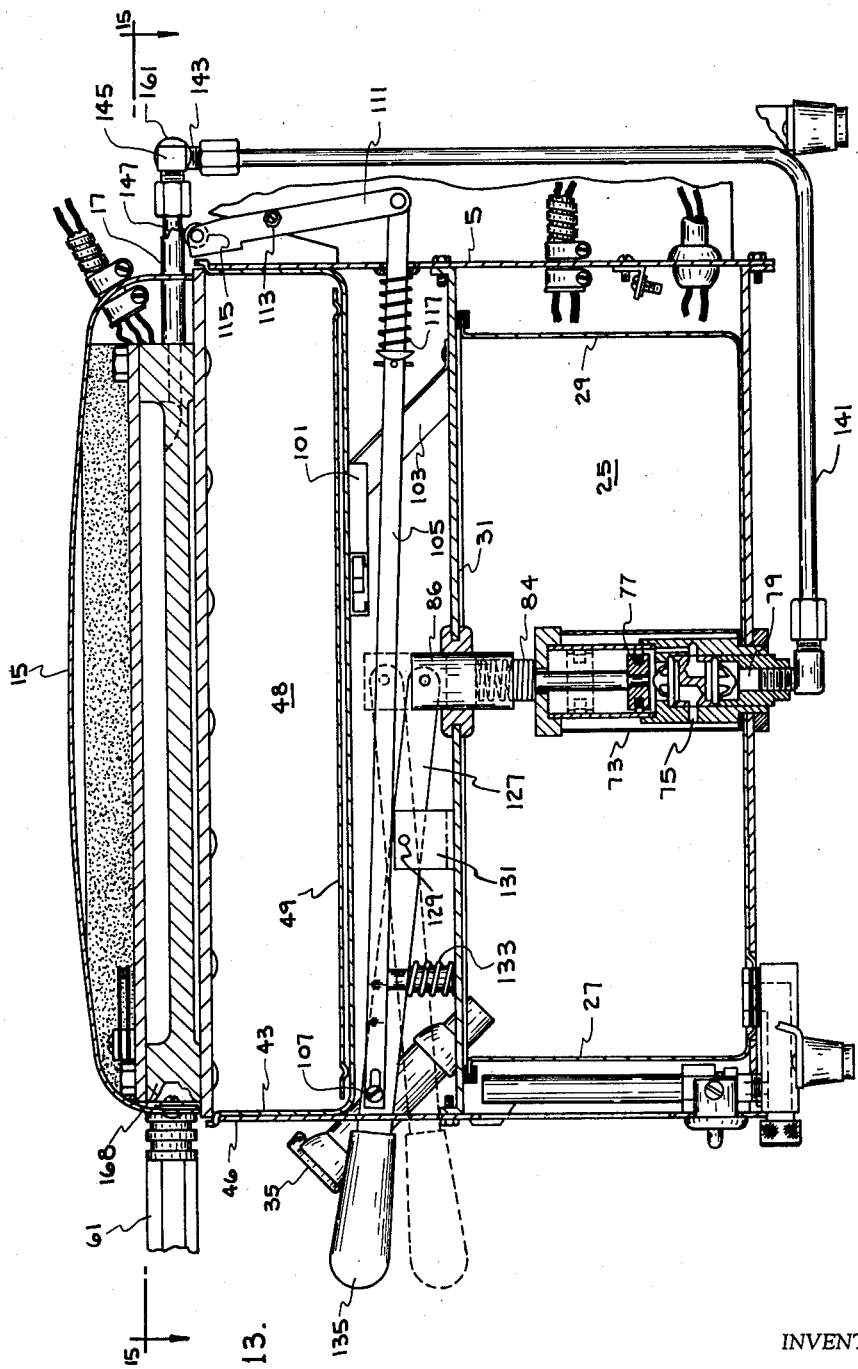

FIG. 13 is a vertical sectional view of another form of the invention.

Figure 14:
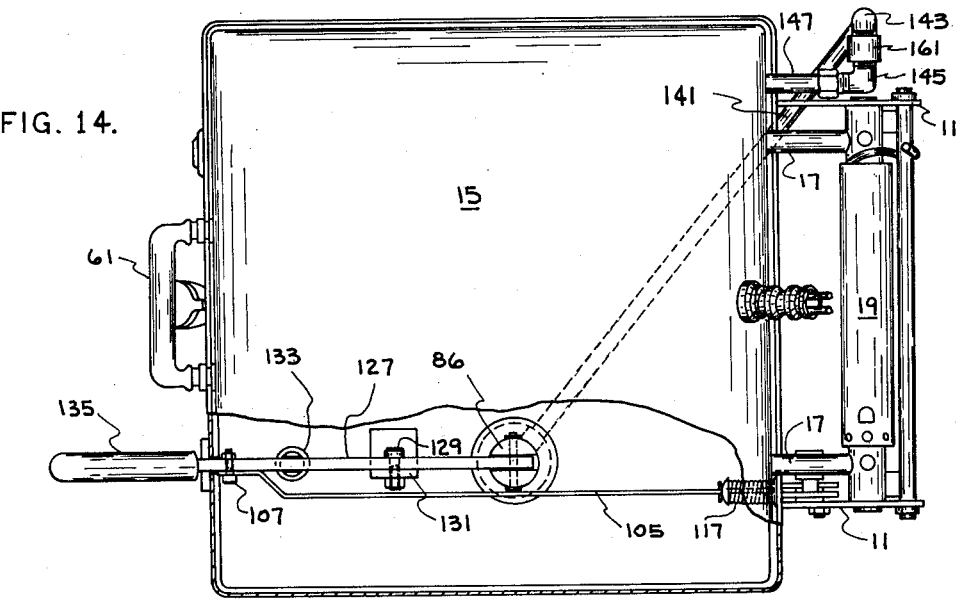

FIG. 14 is a top view, partly sectionalized, of the apparatus illustrated in FIG. 13.

Figure 15:
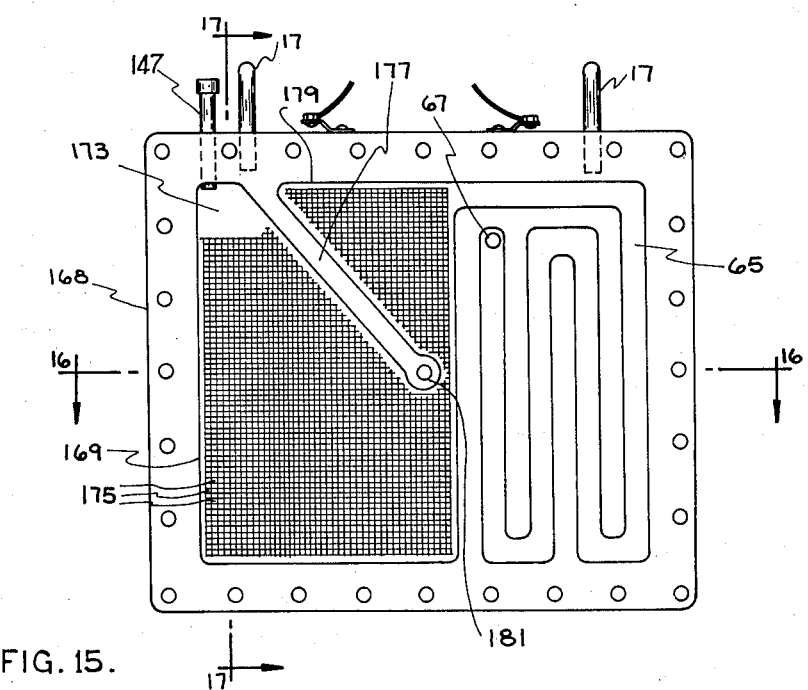

FIG 15 is a top view of the modified steam generator casting used in the modified apparatus.

Figure 16:
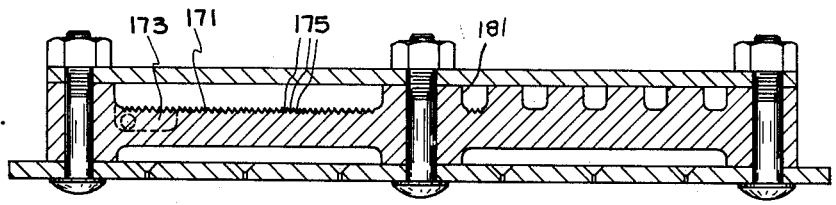

FIG. 16 is a vertical sectional view along line 16—16 of FIG. 15.

Figure 17:
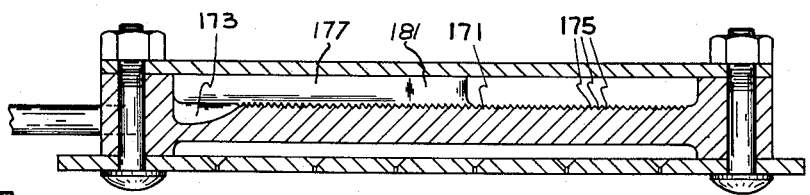

FIG. 17 is a vertical sectional view along line 17—17 of FIG. 15.

Figure 18:
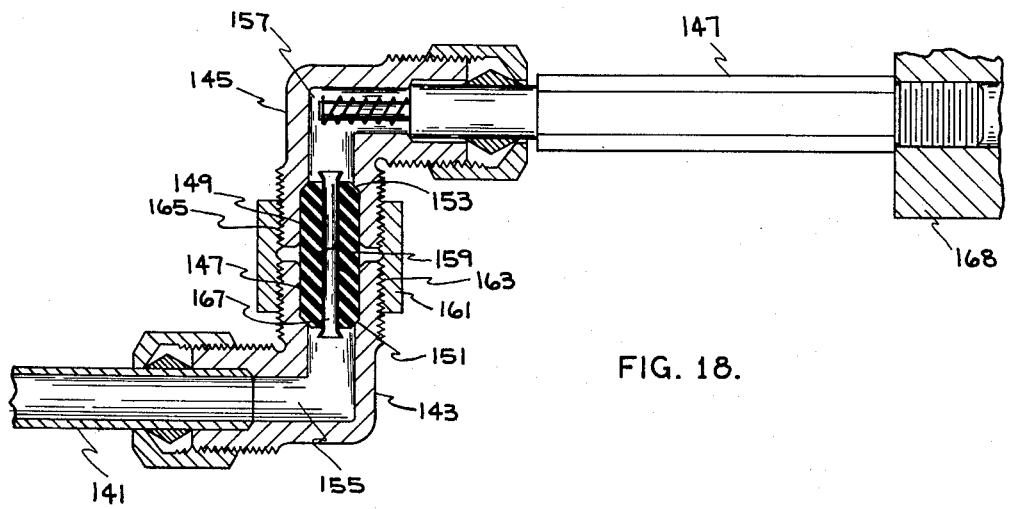

FIG. 18 is an enlarged sectional view along the center line of the hinged coupling in the reservoir-steam generator pipe of the modified apparatus.

Referring now to the drawings, the numeral 1 generally indicates a food freshener having a substantially rectangular case or housing of sheet metal comprising forward wall 3, rear wall 5, side walls 7 and bottom wall 9. Rear wall 5 is provided with a pair of rearwardly extending upright brackets 11, in which are journaled the ends of a trunnion member 13, to which cover 15 is rigidly secured by rearwardly extending pins 17 to permit the cover to be swung upwardly from its closed position. A counterbalance is mounted on trunnion member 13 to assist in raising relatively heavy cover 15.

The counterbalance consists of a torsion spring 16 wound on trunnion member 13, with its one end 16a hooked on a bar 18 fixed to brackets 11, and its opposite end secured to the end of a cylindrical sleeve 19 surrounding trunnion member 13 and spring 16, by means of an inturned tab 19a on sleeve 19 near the end of the latter remote from the fixed end of spring 16. Between tab 19a and the adjacent end of sleeve 19, the sleeve is formed with a series of circumferentially spaced holes 19b, adapted for selective registry with a dimetral hole 13a in trunion 13, and a pin 20 passing through a selected hole 19b in the sleeve and into hole 13a in the trunnion member transmits torsional energy of the spring to the trunnion member in opposition to the gravitational effect of the weight of the cover. Tension of the spring can be adjusted as desired by removing pin 20, rotating the sleeve until a different hole 19b is in registry with trunnion hole 13a and then inserting the pin into the registering holes. Sleeve 19 also serves as a protective enclosure for the spring.

Bottom wall 9 and the lower portions of brackets 11 are provided with depending legs 21 and 22 for spacing the bottom wall of the apparatus from the surface upon which it is mounted.

The lower portion of the housing consists mainly of a water reservoir 25 having upright walls 27 and 29 spaced inwardly from outer walls 3 and 5 respectively, and an upper horizontal wall 31. For filling reservoir 25 an inclined passageway 33 extends upwardly and outwardly of front wall 3 from the upper portion of reservoir 25 and is provided at its outer end with a hinged filler cap 35. For draining the reservoir, an outlet passage 37 communicates with its bottom wall and is provided at its outer end with a drain plug 39. An upright glass tube 41 communicates with drain passage 37 and is in registry with a vertically elongated opening in front wall 3 so as to visually indicate water level in the reservoir at all times.

A removable food tray 43, the outer dimensions of which are substantially the same as the inner dimensions of the freshener housing, is received within the upper portion of the housing, with its bottom wall 45 spaced vertically from the top wall 31 of the reservoir and with its upright forward wall 46, rear wall 47 and side walls 48 formed with outwardly and upwardly extending flanges 50 adapted to be seated on the upper edges of the corresponding walls of the housing. A plate 49 perforated as at 50 provided in tray 43 permits any grease and drippings to drop to the bottom of the tray clear of the food items.

Cover 15 comprises a rectangular block 51, preferably of aluminum because of its lightness and high thermal conductivity, to which are bolted top and bottom cover plates 53 and 55 respectively, the latter being of substantially the same dimensions as the inner dimensions of the flange 50 of food tray 43 so as to be receivable within the vertical rim of flange 50 and seatable on the lower portion of flange 50 when the cover is in closed position. Members 51 and 53 are completely enclosed within a sheet metal sheath 57, between which and the upper surface of top cover plate 53 is positioned a sheet of insulating material 59. Pins 17 are secured in and project rearwardly from the rear vertical surface of block 51 and pass through close-fitting holes in the rear portion of sheath 57. A pair of screws 58 extending through openings in the front of sheath 57, and into the front of block 51, cooperate with pins 17 to secure the sheath to the block. A suitable handle 61 is fastened to the forward side of sheath member 57 to enable the cover to be manually raised and lowered.

Block 51 is formed with an upwardly-open rectangular recess which, with top cover plate 53, forms the steam generating chamber 63; and with an upwardly-open narrow elongated circuitous recess which, with top cover plate 53, forms a superheating passageway 65 having an entrance 65a from chamber 63. Passageway 65 communicates at its extremity remote from its entrance, by means of a pair of vertical holes 67 through block 51, with a downwardly-open rectangular recess in block 51, which, with bottom cover plate 55, forms steam discharge chamber 69. Plate 55 also forms, with tray 43, an enclosed food chamber. Outlets 70 are formed at uniformly spaced intervals throughout the area of bottom cover plate 55 to discharge steam from chamber 69 into and distribute it uniformly throughout the food chamber.

The chambers formed by block 51 and its top and bottom cover plate are heated by an electric resistance heating element 71, which is mounted within block 51 between the upper and lower recesses therein.

For providing measured charges of water to the steam generating chamber 63, a pump 73 is located within reservoir 25. Pump 73 includes a horizontal inlet passage 75 communicating with reservoir 25, a vertically acting piston 77, and an outlet 79 connected by means of a suitable hose 81 with generating chamber inlet valve 83, which is positioned near one side of the cover and extends into block 51 through an enlarged opening in the rear portion of sheath 57. Pump piston 77 is connected by an upwardly extending rod 85 and a cylindrical clevis block 86 to lever arm 87 located in the space between the bottom of food tray 43 and top wall 31 of the reservoir and fulcrumed at 89 on the rear wall 5 of the case. A coil spring 84, concentric with piston rod 85 and seated between the top of pump 73 and the bottom of block 86, normally urges piston 77 and pump lever 87 to their uppermost or intake positions. The forward end of lever 87 extends through a slot 91 in the forward wall 3 and is provided outwardly thereof with a suitable handle 93. The stroke of piston 77 is sufficient to provide a single charge of water to generating chamber 63 so that when lever 87 is pushed downwardly through its full stroke, a suitable quantity of water will be forced through hose 81, causing closure 95 of generating chamber inlet valve 83 to open against the resistance of spring 97 sufficiently to admit the charge of water to the steam generating chamber. Upon the admission of the desired quantity of water to the steam generating chamber, spring 97 urges valve closure member 95 into its closed position. The water, upon contacting the heated surfaces of steam generating chamber 63, turns instantly into steam and passes through passageway 65 wherein it is superheated, thence through openings 67 into distribution chamber 69, wherein its heat is retained by contact with the upper heated wall of chamber 69. Outlets 70 permit the passage of the dry, superheated steam into the food tray 43 where it restores any food contained therein to a freshened condition.

To prevent condensation of the steam received within tray 43, a resistance heating element 101 is resiliently supported by a strap 103 mounted on horizontal, inside wall 31 so that heating element 101 is normally urged against the bottom surface of tray bottom wall 45 and heats it by conduction.

Figure 2:
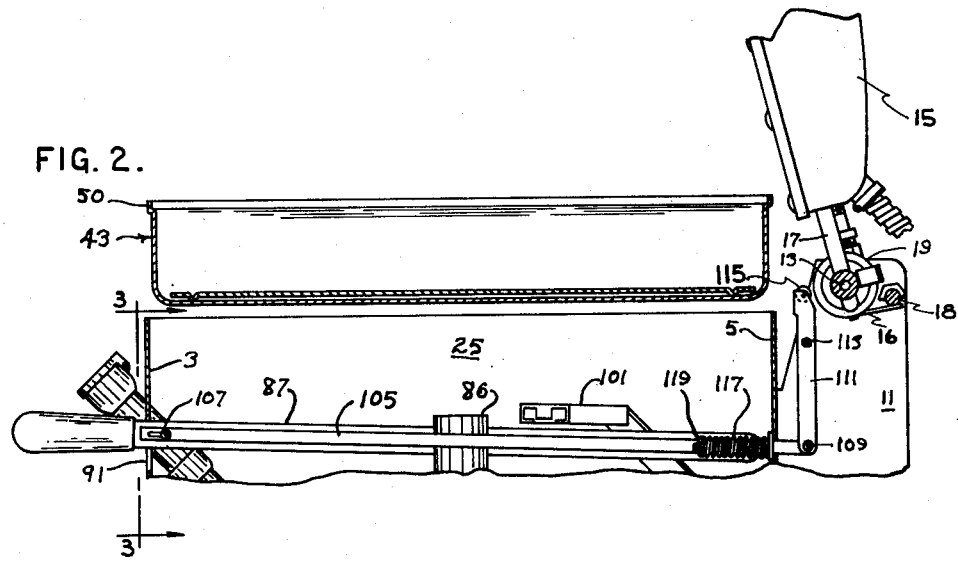
FIG. 2 is a fragmentary, vertical sectional view of the upper part of FIG. 1, with the lid raised and the pump handle locked in inoperative position.
Figure 3:
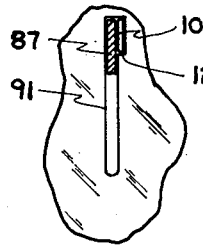
FIG. 3 is a fragmentary front view of the food freshener, sectionalized along line 3—3 of FIG. 1.

To prevent the generation of steam when cover 15 is in raised position, as shown in FIG. 2, a locking bar 105 extends parallel to pump lever 87 and is secured to it as at 107 by a screw passing through an elongated slot in bar 105, for relative lengthwise movement only. The rear end of locking bar 105 extends rearwardly through an opening in rear wall 5 and is pivotally connected as at 109 to a lever 111 fulcrumed on bracket 11 at 113 and provided at its upper end with a roller 115 adapted to engage the lower surface of one of the pins 17 when the cover is in its lowered or closed position. A spring 117 surrounding bar 105 and seated at one end against rear wall 5 and at its other end against a shoulder 119 formed on bar 105 normally urges the latter forwardly so that when cover 15 is opened and roller 115 is unrestrained by pin 17, spring 117 urges bar 105 forwardly, causing lever 111 to rotate about its fulcrum and causing the forward end of bar 105 to extend into the enlarged upper portion 121 of pump lever slot 91 in forward wall 3 so as to prevent downward movement of pump lever 87 when the cover 15 is open.

Figure 1:
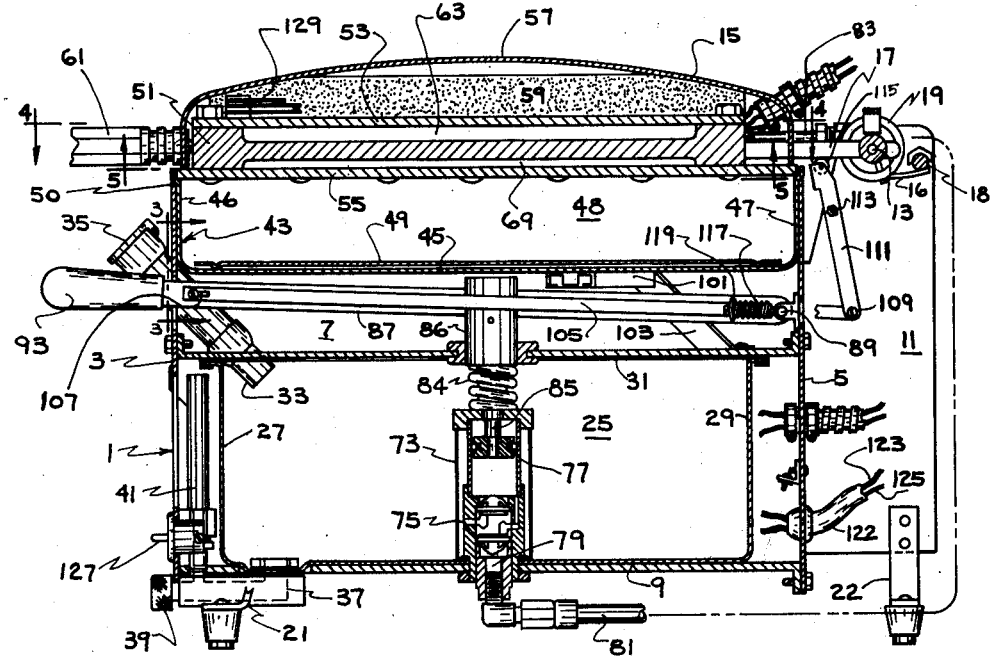
FIG. 1 is a vertical sectional view of a food freshener embodying the invention.

Electric current for the operation of the heating elements is provided from the usual plug-in outlet, through a cord 122 containing conductors 123 and 125. The main circuit comprises manual switch 127, mounted in front wall 3 of the housing, thermostatic switch 129, mounted on top cover plate 53 of the steam generator (FIG. 1), and steam generator heating element 71. An indicator light 131 positioned in front wall 3 is connected in parallel with the steam generator heating element to indicate when the latter is energized. The food tray heating element 101 is connected in parallel with the portion of the main circuit containing the thermostatic switch, steam generator heating element, and indicator light.

Operation of the device is as follows:

Rolls, bread, cake, pastry or other items of food, which it is desired to refreshen, are placed in tray 43. Switch 127 is closed, energizing the parallel circuits through heating elements 71 and 101. After allowing sufficient time for heating elements 71 to heat casting 51, pump arm 87 is urged downwardly, compressing pump spring 84 and causing pump piston 77 to force a charge of water through hose 81 and inlet check valve 83 into steam generating chamber 63 where it is instantly converted to steam, which passes through superheating passages 65 and openings 67 into discharge chamber 69, from whence it passes through openings 70 into the food chamber formed within tray 43 so as to refreshen the food contained therein. Meanwhile, spring 84 will have urged clevis block 86, piston rod 85, piston 77 and the pump lever 87 upwardly, drawing a new charge of water into the pump. When block 51 reaches a predetermined temperature, thermostatic switch 129 opens, breaking the circuit through heating elements 71 and remains open until the temperature of chamber 63 falls below the predetermined temperature.

If it is desired to leave the food articles in the tray, they will be kept warm by heating element 101 which, as pointed out above, has sufficiently warmed the tray to prevent the condensation of steam on its inner surfaces. When it is desired to remove the food from the device, the cover is raised by means of handle 61 aided by counterbalance spring 16, and, if desired, the entire tray can be removed from the housing. While the cover is in open position, it will be impossible to produce steam because the pump lever 87 will be retained in its uppermost position by locking arm 105, as described above.

In the embodiment of the invention illustrated in FIGS. 13 to 18, in order to prevent the injection of excessive amounts of water into the flash chamber, the pump actuating means is arranged so that piston 77 is normally positioned in the lowermost or discharge position and downward pressure on the operating lever handle effects an intake stroke of the pump piston, the discharge stroke being effected at a predetermined rate by spring means. To accomplish this, a relatively short operating lever 127 is connected at its inner end to pump clevis block 86, its outer end extending through slot 91, and is fulcrumed at 129 intermediate its ends on a bracket 131 mounted on inner horizontal wall 31. An upstanding coil spring 133 is seated on wall 31 beneath the outer arm of lever 127, and bears against the lower edge of the latter to bias its outer arm upwardly against the upper end of slot 91 and its inner arm downwardly, overcoming the resistance of pump spring 84, and consequently biasing pump plunger 77 to its lowermost, or discharge, position. The outer end of lever 127 protrudes through slot 91 and is provided with an operating handle. As in the first form of the invention, locking bar 105 is slidably connected to lever 127 at 107, and prevents operation of lever 127 when cover 15 is open. With this arrangement, downward pressure, on handle 135, regardless of how hard, will merely draw water into pump 73, and, since upward movement of handle 135 is caused by differential pressure of spring 133 over spring 84, the downward or discharge movement of pump piston 77 will be at a predetermined rate.

In this form of the invention, the passage of water from pump discharge 79 is facilitated by the provision of a rigid conduit including metal tube 141 in place of the flexible hose 81. To accommodate pivoting of the cover, the conduit includes a portion aligned with cover trunnion 13, and comprising aligned horizontal arms of a pair of elbows 143 and 145, one of which is secured to the end of tube 141 remote from the pump, and the other of which is secured to flash chamber inlet check valve 147, which generally resembles valve 83 hereinbefore described. The cylindrical end portions of the bores of elbows 143 and 145 are enlarged as at 148 and 149, forming tapered shoulders 151 and 153 at their junctures with the normal bores 155 and 157. A tubular mass of rubber-like material, comprising a short section of rubber hose 159, of substantially the same outside diameter as the inside diameter of large bores 148 and 149 is positioned in the large bores, and a threaded sleeve 161 is tightened on the externally threaded adjacent end portions 163 and 165 of elbows 143 and 145 until the ends of hose 159 are firmly seated in sealing engagement with shoulders 151 and 153, thus compressing the hose in the chamber formed by enlarged bores 148, 149, the torsional yieldability of the rubber permitting elbow 145 to rotate about the axis common to itself and elbow 143 whenever the cover is opened or closed. Hose 159 is provided with a tubular metal liner 167, which forms a permanently open passageway between the coupled elbows irrespective of the extent to which hose 159 may be distorted by relative rotation of the elbows, the thickness of the wall of hose 159 being sufficient to permit substantial torsional shear between its outer bore-engaging surface and its inner liner-engaging surface.

The steam generator 168 of this embodiment differs from that of the previously-described embodiment in the construction of flash chamber 169 (FIGS. 15, 16, 17). In all other respects steam generator 168 is identical to that illustrated in FIGS. 4–7, top wall 170 and bottom wall 172 corresponding to top and bottom walls 53 and 55, superheating passage 174 and its outlet 176 corresponding to elements 65 and 67, and distributor chamber 178 to distributor chamber 69 of FIGS. 4–7. To permit the lowering of inlet valve 147 to the same level as hinge pins 17, necessitated by the coupling of elbows 143 and 145 on the same axis as the cover pivot, the bottom wall 171 of the flash chamber is depressed in the left hand rear corner as at 173. To improve steaming, by breaking the water up into small droplets, the surface of the bottom wall is roughened by crisscrossing it with closely-spaced V-shaped furrows 175 at right angles to each other, and, a diagonal partition 177 is formed between the peripheral upright wall 179 and central boss 181 to form with the side portion of peripheral wall 179 a pair of diverging walls directing the incoming water from inlet valve 147 into interconnected furrows 175. With this arrangement, when water is admitted to the flash chamber, instead of being turned into steam in one large mass immediately upon entry, it is broken into droplets by the furrows and more complete vaporization takes place throughout the area of the chamber. This effect is augmented by the fact that the water inlet check valve axis is parallel and in close proximity to the furrowed surface so that the incoming stream of water moves generally parallel to this surface and is evenly distributed through the furrows.

Operation of the food freshener illustrated in FIGS. 13–18 is generally similar to that illustrated in FIGS. 1–12. However, in this form of the invention, the possibility of injecting too much water into the flash chamber for the flash chamber to instantly vaporize is eliminated by the arrangement of the pump lever so that the manual downstroke of the lever, which may be very fast and powerful, causes the intake stroke of the pump plunger, and the discharge stroke of the pump plunger is effected by spring 133 so that irrespective of the speed and power of the lever downstroke, the rate of injection of water will be substantially constant.

With this arrangement water will be forced into the flash chamber only as fast as it can be vaporized and the possibility of unvaporized water passing into the food chamber is eliminated. In both arrangements the amount of water injected into the flash chamber at any time can be controlled as desired by the operator by varying the length or number of lever downstrokes.

The passage of water from the pump to the flash chamber is facilitated by the use of a metal pipe conduit, pivoting of the cover being accommodated without leakage by coupling between elbows 143 and 145.

Water injected into flash chamber 168, instead of remaining in one large mass, is broken into droplets by the furrowed bottom surface 171 of the chamber and distributed throughout the areas of the chamber, thus effecting rapid and uniform vaporization of all the water injected, and further reducing the possibility that unvaporized water will enter the food chamber.

As various changes could be made in the above construction without departing from the scope of the invention, it is intended that all matter contained in the above description or shown in the accompanying drawings shall be interpreted as illustrative and not in a limiting sense.

What is claimed is:

1. Food freshening apparatus comprising a housing containing a water reservoir and a food chamber, structure pivoted to said housing and including a pivoted cover for said food chamber, a steam generator and means for discharging steam therefrom into said food chamber, a pump communicating with said reservoir and having its discharge connected to said generator, a lever fulcrumed to said housing and operatively connected to said pump, said housing having a slot therein of sufficient width to receive said lever and of greater width at one end whereby a shoulder is formed on one side of said slot, said lever extending through said slot, a bar extending substantially parallel to said lever and connected to said lever at a point remote from the fulcrum for movement lengthwise only of said lever, resilient means biasing said bar lengthwise of said lever into said enlarged end portion of said slot whereby to engage said shoulder and prevent movement of said lever when said cover is raised, and additional means actuated by said cover when the latter is closed to retract said bar from the slot.

2. Food freshening apparatus comprising a housing containing a water reservoir and a food chamber, structure pivoted to said housing and including a cover for said food chamber, a steam generator, means for discharging steam from said generator into said food chamber, a pump communicating with said reservoir and having its discharge connected to said generator, a lever fulcrumed to said housing and operatively connected to said pump, said housing having a slot therein of sufficient width to receive said lever and of greater width at one end whereby a shoulder is formed on one side of said slot, said lever extending through said slot, a bar extending substantially parallel to said lever and connected to said lever at a point remote from the fulcrum for movement lengthwise only of said lever, a second lever rotatably fulcrumed intermediate its ends on said housing and angularly disposed relative to said bar, said second lever being pivoted to said bar at one end and having its opposite end in engagement with said pivoted structure only when said cover is closed, said engagement restraining said second lever from rotation and holding said bar clear of said slot, spring means seated on said housing and normally urging said bar toward said opening in opposition to the restraint imposed on said bar by said second lever, said second lever being disengaged from said pivoted structure and freed to rotate to accommodate spring-actuated movement of said bar into said slot when said cover is raised, whereby said bar engages said shoulder and prevents movement of said first lever when said cover is raised.

3. Food freshening apparatus according to claim 2 in which said steam generator comprises wall structure forming a generating chamber, an elongated superheating passageway communicating with said generating chamber, and a discharge chamber connected to the end of said passageway remote from said generating chamber, said wall structure including a common wall separating said generating chamber and passageway from said discharge chamber, said wall containing a heating device and being thermally conductive whereby to heat said generating chamber, superheating passageway, and discharge chamber.

4. Food freshening apparatus according to claim 3 in which said pivoted structure includes a trunnion member pivoted to said housing on a horizontal axis, a coil spring surrounding said trunnion member and having a portion connected to said housing, a sleeve surrounding said spring and connected to another portion of said spring, and means for fixing said sleeve and said trunnion member in selected angular relationships about the axis of said trunnion member whereby to vary the tension on said spring.

5. Food freshening apparatus comprising a housing containing a food chamber, structure including a cover for said food chamber and a trunnion member fixed to said cover and pivoted to said housing on a horizontal axis, a coil spring surrounding said trunnion member and having a portion connected to said housing, a sleeve member surrounding said spring and connected to another portion of said spring, a hole in one of said members and a plurality of holes in said other member selectively radially alignable with said first-named hole, and a pin in said aligned holes for fixing said sleeve and said trunnion member in selected angular relationships spaced apart less than 180° about the axis of said trunnion member whereby to vary the tension on said spring.

6. A pivot device comprising first and second parts, a trunnion member fixed to one of said parts and pivoted to said other part, a coil spring surrounding said trunnion member and having a portion connected to said first part, a sleeve member surrounding said spring and connected to another portion of said spring, a hole in one of said members and a plurality of holes in said other member selectively radially alignable with said first-named hole, and a pin in said aligned holes for fixing said sleeve member and said trunnion member in selected angular relationships spaced apart less than 180° about the axis of said trunnion member whereby to vary the tension on said spring.

7. Food freshening apparatus according to claim 1 in which said pump includes a piston movable downwardly for discharge, said lever being connected at one end to said piston and having its fulcrum on said housing between its ends, resilient means biasing the end of said lever protruding from said housing upwardly, and additional resilient means yieldingly opposing downward movement of said lever, said additional resilient means exerting less force on said lever than said first resilient means whereby said piston is normally biased to its full discharge position.

8. Food freshening apparatus according to claim 1 in which a conduit connects said pump discharge and said steam generator, and said steam generator is located within said pivoted cover, said conduit including a portion parallel to the pivot axis of said cover, said parallel portion including a pair of axially aligned tubes with internal circumferential shoulders spaced inwardly from their opposing ends, a hollow mass of rubber-like material received within the enlarged bores and having its ends seated against said shoulders, a tube of rigid material passing through said rubber-like mass and means urging said aligned tubes toward each other but permitting relative rotation about their common axis whereby to maintain the ends of said rubber-like mass in sealing engagement with said shoulders irrespective of the relative rotational positions of said tubes.

9. A coupling comprising a pair of axially aligned tubular conduits with their ends in opposing relation and having internal circumferential shoulders spaced inwardly from their ends, a rubber-like centrally apertured tubular mass received within the end portions of said tubes outwardly of said shoulders and having its opposite ends seated against said shoulders, a tubular liner of rigid material passing through the aperture in said rubber-like mass, and means holding said aligned tubes in longitudinally fixed relation with each other but permitting their relative rotation about their common axis, said rubber-like mass being of sufficient thickness to permit torsional distortion as required to accommodate rotation of said tubular conduits relative to each other and to said tubular liner.

10. Apparatus comprising wall means forming a water reservoir, additional wall means forming a steam generator pivotally connected to said water reservoir and having an internal upwardly facing heat-transmitting surface of roughened character for breaking up water injected into said generator into small droplets, a pump having its intake in communication with said reservoir, a conduit connecting the discharge of said pump with said generator, said conduit including a portion aligned with the pivot axis of said generator, said parallel portion including a pair of axially aligned tubes with internal circumferential shoulders spaced inwardly from their opposing ends, a centrally apertured mass of rubber-like material positioned in and completely filling the space in the end portion of said tubular liner between said shoulders, a tube of rigid material passing through the aperture in said rubber-like mass, and means holding said aligned tubes in longitudinally fixed relation with each other but permitting their relative rotation about their common axis whereby to maintain the ends of said rubber-like mass in sealing engagement with said shoulders irrespective of the relative rotational position of said tubes, said rubber-like mass being of sufficient thickness to permit its torsional distortion as required to accommodate rotation of said tubes relative to each other and to said tubular liner, a lever connected to said pump and movable downwardly for effecting intake movements thereof and resilient means biasing said lever upwardly and causing discharge movements of said pump, and means normally obstructing downward movement of said lever and operably connected to the pivotal connection between said reservoir- and said generator-forming wall means to clear said lever when said generator is moved about its pivotal connection to a predetermined position relative to said reservoir.

11. Food freshening apparatus comprising a housing containing a water reservoir and a food chamber, structure pivoted to said housing and including a cover for said food chamber, a steam generator in said cover comprising wall structure forming a generating chamber, an elongated superheating passageway communicating at one end with said generating chamber, and a discharge chamber connected to the end of said passageway remote from said generating chamber and having an outlet communicating with said food chamber, said wall structure including a common wall separating said generating chamber and superheating passageway from said discharge chamber, said wall containing a heating element and being thermally conductive whereby to heat said generating chamber, superheating passageway, and discharge chamber, a pump having an inlet from said reservoir and having its outlet connected to said generating chamber, said food chamber including a removable food-receiving tray normally seated in the upper portion of said housing, and a heating device resiliently mounted within said housing for abutting engagement with an outer surface of said tray when said tray is in its normal seated position.

12. A steam generating device comprising wall structure forming a generating chamber and including a substantially horizontal flat bottom wall, said bottom wall containing a heating device and being thermally conductive, a water inlet into said generating chamber with its axis parallel to the upper surface of said bottom wall, the upper surface of said bottom wall being formed with interconnected furrows communicating with said inlet whereby water injected through said inlet is dispersed evenly throughout a substantial area of said furrowed surface.

References Cited by the Examiner

UNITED STATES PATENTS

| | | | |
|---|---|---|---|
| 1,221,707 | 4/17 | Durbin | 285—98 |
| 1,387,794 | 8/21 | Mantel | 220—35 |
| 2,181,434 | 11/39 | Lewis et al. | |
| 2,637,126 | 5/53 | Fitzsimmons | 38—77 |
| 2,853,814 | 9/58 | Brendler et al. | 38—77 |
| 2,973,705 | 3/61 | Klemm | 99—234 |
| 2,980,099 | 4/61 | Klemm | 99—234 |
| 3,069,994 | 12/62 | Lewis | 99—234 |

FOREIGN PATENTS

| | | |
|---|---|---|
| 808,719 | 11/36 | France. |
| 961,371 | 4/57 | Germany. |

CHARLES A. WILLMUTH, *Primary Examiner.*

JEROME SCHNALL, ROBERT E. PULFREY,
*Examiners.*